United States Patent [19]
Hill

[11] 3,742,949
[45] July 3, 1973

[54] SYRINGE ASSEMBLY

[76] Inventor: Clifford W. Hill, 8 Summit Place, Pleasantville, N.Y. 10570

[22] Filed: Feb. 14, 1972

[21] Appl. No.: 225,869

[52] U.S. Cl....... 128/218 PA, 128/218 P, 206/63.2, 222/386
[51] Int. Cl. ............ A61m 5/00, A61m 5/22
[58] Field of Search............... 128/218 R, 218 P, 128/218 PA, 234

[56] References Cited
UNITED STATES PATENTS
1,648,135  11/1927  Klett................. 128/218 P
2,695,613  11/1954  MacGregor......... 128/218 P
2,832,340  4/1958  Dann et al............ 128/218 P
2,895,773  7/1959  McConnaughey...... 128/218 P FOREIGN PATENTS OR APPLICATIONS
255,886    1/1902  France............. 128/218 PA
1,104,570  6/1955  France............. 128/218 P
1,500,009  9/1967  France............. 128/218 P Primary Examiner—Aldrich F. Medbery
Attorney—Richard S. Shreve, Jr.

[57] ABSTRACT

Syringe with a nonlubricated plunger body having a narrow sealing bearing, a centering bearing, and a rear socket with a bore extending inside said bearings and socket, and a plunger rod having a mounting portion with a tapered end and having sharp ridges which engage said bore.

16 Claims, 6 Drawing Figures

3,742,949

SYRINGE ASSEMBLY

BACKGROUND

This invention relates to a syringe and more particularly to a syringe that does not require any lubrication and has one or more volume stops to permit repeated filling to the same volume or volumes.

Prior to the present invention, there has not been a completely satisfactory hypodermic syringe with a means to permit accurate repeated filling to the same volume. One very important example of this need concerns insulin hypodermic syringes for diabetics. Diabetics frequently take the same dosage of insulin day after day, but it is reported that as many as 59 percent of diabetics make dosage errors using conventional syringes.

PRIOR ART

Hamilton U.S. Pat. No. 3,150,801 requires excessive forces to move the plunger, it is difficult to clean the deep groove, there would be excessive wasted volume of medicament, it is relatively expensive to manufacture, and there is no means to permit accurate repeated filling to the same volume.

Poli U.S. Pat. No. 3,162,217 requires excessive forces to move the plunger, it does not have sufficient flexibility of the plunger tip to permit sealing under tolerance extremes that would result from low cost manufacture, and it has many parts.

Hill U.S. Pat. No. 3,237,660 is generally satisfactory with the important exception that initial and subsequent lubrication of the rubber or synthetic rubber plunger tip is required, and immersion in alcohol necessitates more frequent relubrication.

Von Pechmann U.S. Pat. No. 3,253,592 requires lubrication, it is not suitable for repeated usage, it has an internal undercut in the plunger tip that would be impractical to manufacture for smaller reusable syringes in a material that does not require lubrication, and there is no means to permit accurate repeated filling to the same volume.

Reid U.S. Pat. No. 3,581,956 requires excessive forces to move the plunger, it is difficult to clean the grooves and O-ring, there would be excessive wasted volume of medicament, it is expensive to manufacture, and there is no means to permit accurate repeated filling to the same volume.

SUMMARY

The present invention comprises a barrel having a bore, a plunger body having a sealing bearing and a centering bearing that are slidable in said bore, and a rear socket wall, a plunger rod for propelling said plunger body, a volume stop longitudinally movably mounted on said plunger rod, means for locking said volume stop in selected volume determining positions, said plunger body preferably having a bore extending inside said bearings and rear socket wall, said plunger rod preferably having a forward portion with sharp external ridges, the bore in said plunger body being engaged by said ridges thus providing an elastic mounting for the forward portion of said rod in said bearings, the centering bearing on said plunger body preferably being forward of said ridges and having a diameter slightly less than the bore of the barrel, the sealing bearing preferably having a width of only about one thirty-second inch for a 1cc syringe, and the sealing bearing being made of a material that does not require lubrication.

DRAWINGS

DESCRIPTION OF THE PREFERRED EMBODIMENTS

Figure 1:
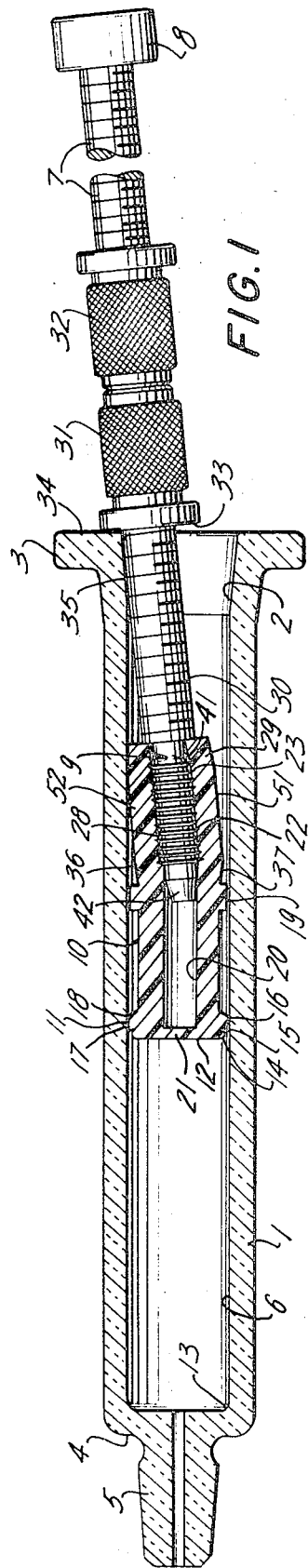
FIG. 1 is a sectional side view of an assembly wherein the plunger rod has been pushed to one side by the user so that the volume stop on the plunger rod is in contact with the syringe barrel and thereby measuring the desired volume.

In the form shown, the syringe comprises a barrel 1 having a flared entrance 2 with a flange 3, and an exit end wall 4 and a tip 5 to receive the hub of a needle. A plunger rod 7 is formed of chromium plated brass or stainless steel, and has a head part 8 providing an actuating portion. The forward end of the plunger rod has a mounting portion 9 of reduced diameter upon which a plunger body 10 is mounted.

The plunger body 10 has a forward sealing bearing 11, a centering bearing 19, and a rear socket wall 52. A central hole 20 extends through said rear socket wall on inside of the centering bearing and within the sealing bearing to the front end wall 21. This plunger body 10 is preferably formed of a dimensionally stable material, such as tetrafluoroethylene, that has a low coefficient of friction without lubrication, has adequate sealing qualities, and can be sterilized by conventional means.

Figure 4:
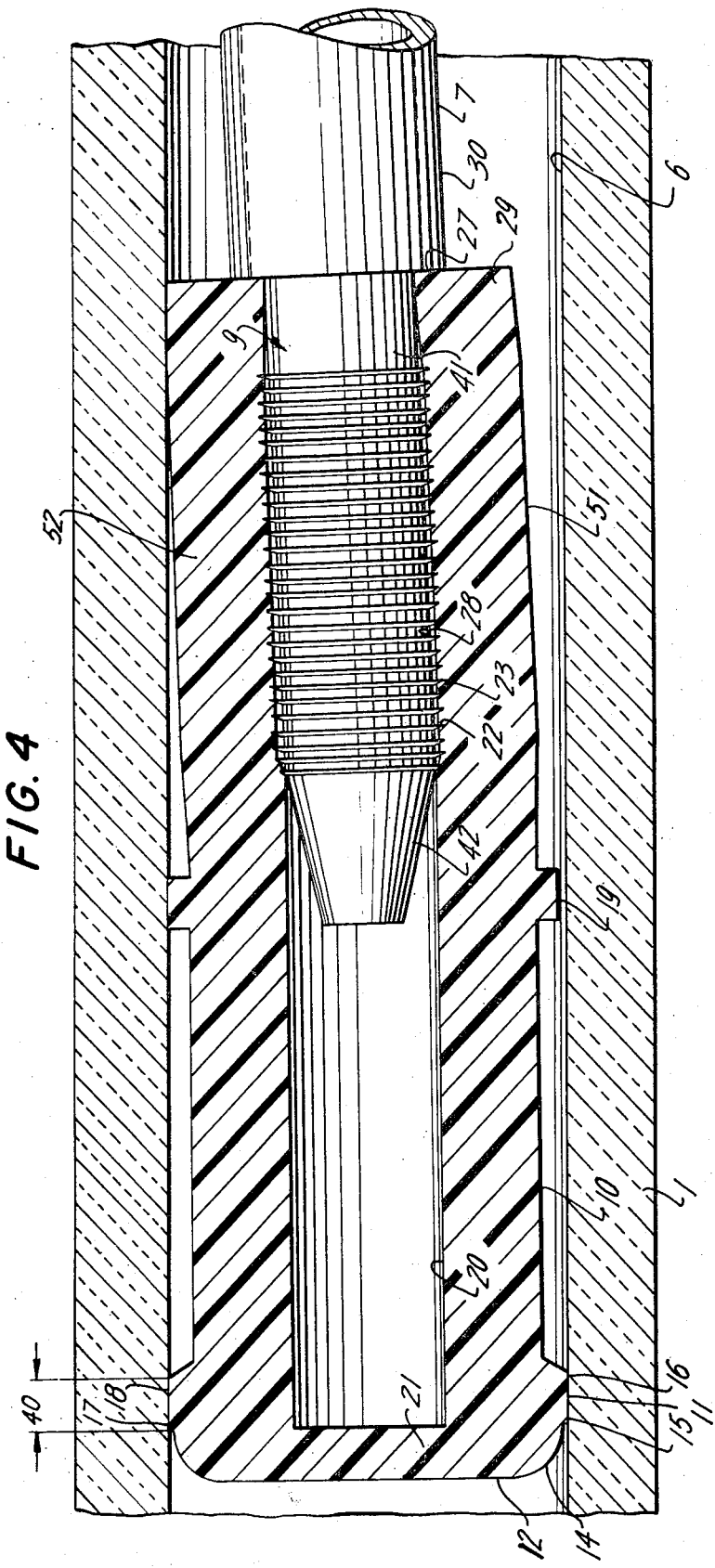
FIG. 4 is an enlarged sectional side view of the plunger body and portions of the plunger rod and barrel with the plunger rod pushed to one side as shown in FIG. 1.

The sealing bearing 11 engages the barrel bore. The length and diameter of annular sealing bearing 11 are critical. When the plunger rod 7 is positioned as shown in FIGS. 1 and 4, there is a tendency for the entire plunger body 10 to rotate, which results in added pressure at the forward end 15 of the sealing bearing 11 and less pressure at the rear end 16 of the sealing bearing 11 at the angular location 180° from the tilted position of the plunger rod 7. At the same time, there is less pressure at the forward end 17 of sealing bearing 11 and added pressure at the back end 18 of sealing bearing 11 at the angular location the same as the tilted position of the plunger rod 7 as shown in FIGS. 1 and 4. These locations of added pressure tend to result in some plastic deformation which can later tend to result in leakage when the plunger rod 7 is tilted to a different angular position. These locations of less pressure tend to result in leakage. Minimizing the length 40 (see FIG.

4) of the sealing bearing 11 minimizes this difficulty. With a 1/16 inch length 40 of sealing bearing 11 in a 1cc insulin syringe having a 0.2530 inch bore 6, there was leakage as a result of this difficulty. A 1/64 inch length 40 of sealing bearing 11 is not practical due to difficulties of manufacture and problems of scratching and marring the sealing bearing 11 during usage. A 1/32 inch length 40 of sealing bearing 11 has been found to prevent leakage and to be the most practical for a 1cc insulin syringe having a 0.2530 inch bore 6. A preferred range of lengths 40 of sealing bearing 11 is from 0.02 to 0.05 inch.

One of the major difficulties concerning nonlubricated 1cc insulin syringes of this type is to reduce the forces required to push the plunger to an optimum value, which is approximately ½ pound, and at the same time to prevent leakage. A major discovery toward this objective was that an unexpectedly large reduction in forces to push the plunger could be achieved by having only one bearing dimensioned larger than the bore 6. By reducing the diameter of a 0.008 inch long centering bearing 19 until it was slightly less than the bore 6, the plunger push force was reduced to only 37 percent of the original value whereas a reduction to only 79 percent of the original value would have been expected when considering the total length of the surfaces that were engaging the bore 6, and further, the original diameter of the centering bearing 19 was less than the diameter of the sealing bearing 11. Also, a slip and stick movement of the plunger was eliminated by reducing the diameter of the sealing bearing to less than the bore 6. Evidently this surprising improvement is related to slight distortion that occurs in the plunger body from pushing the plunger rod to the side, and when both axially spaced bearings are larger in diameter than the bore 6, a binding condition occurs. Thus the preferred embodiment of the plunger body 10 requires that the diameter of the centering bearing 19 be less than the bore 6 and that only the sealing bearing 11 on the plunger body have a diameter that is larger than the diameter of bore 6. Further, there should preferably be only one sealing bearing 11.

In order to achieve optimum centering, it is preferred that the centering bearing 19 be as large as possible without being larger than the minimum diameter of the bore 6. It is preferred that the centering bearing 19 be from 0.0005 to 0.004 inch smaller in diameter than the minimum diameter of the bore 6.

Another important consideration is that forces required to longitudinally move the plunger rod and plunger body assembly are significantly reduced by extending the hole 20 in the plunger body until it is inside the sealing bearing 11 and as far forward as possible with minimum practical front end wall thickness 21. Less force is required to compress sealing bearing 11 with the thin front end wall 21 and the hole 20 than would be required if the plunger body was solid, and this reduced force results in less force to move the plunger rod and plunger body assembly longitudinally. For the 1cc insulin syringe having a 0.2530 inch bore, a preferred front end wall thickness 21 is one thirty-second inch, a preferred diameter of hole 20 is three thirty-seconds inch, and a preferred rear socket wall is one-sixteenth inch.

Another objective concerning the design of the plunger body 10 is to have low manufacturing costs. Centerless ground tetrafluoroethylene rod with plus or minus 0.0005 inch tolerance on the diameter is economically available. The plus or minus 0.0005 inch tolerance with the centerless ground surface is suitable for the sealing bearing 11, and the remaining shape for the plunger body 10 as shown in FIGS. 1 - 4, except without the bulge 51 which is the result of assembly over the plunger rod mounting 9, can be economically produced by automatic machining equipment. The plunger body 10 made of centerless ground tetrafluoroethylene rod for a 1cc insulin syringe could be purchased in 1971 for less than $0.06 each in production quantities, which is very satisfactory for a reusable syringe.

The absence of leakage and other difficulties in combination with near optimum forces to longitudinally move the plunger body and plunger rod assembly was achieved with a sealing bearing diameter 11 of 0.2560 plus or minus 0.0005 inch and a sealing bearing length 40 of one thirty-second inch when used with a 1cc insulin syringe barrel having a 0.2530 to 0.2531 inch bore 6. This preferred relationship results in the diameter of the sealing bearing 11 being from 0.0024 to 0.0035 inch larger than the diameter of the bore 6.

In order to provide close control of the diameter of the centering bearing 19, it is preferable that it be located forward of the bulge 51 that results when the plunger rod mounting 9 is pressed into the plunger body hole 20. FIGS. 1 - 4 illustrate this relationship.

The forward end of the plunger body preferably terminates in a face 12 which should conform to the inner face of end wall 4. It is also desirable to locate the sealing bearing 11 one thirty-second inch or more from the face 12 because of a reduced or less accurate diameter at the bottom end 13 of the barrel bore. However, in order to reduce the volume of waste medicine, it is desirable to locate the sealing bearing 11 as near to face 12 as is practical. In the case of a 1cc insulin syringe with a 0.2530 inch bore 6, it has been found most practical to provide a 1/32 inch radius 14 at the forward corner of the plunger body and to start the sealing bearing one thirty-second inch from the face 12.

Providing a threaded mounting of the plunger body on the plunger rod proved to be unsatisfactory due to gradual disengagement of the plunger body. A completely secure mounting is particularly vital to the many patients such as blind diabetics who use this type of syringe.

Figure 2:
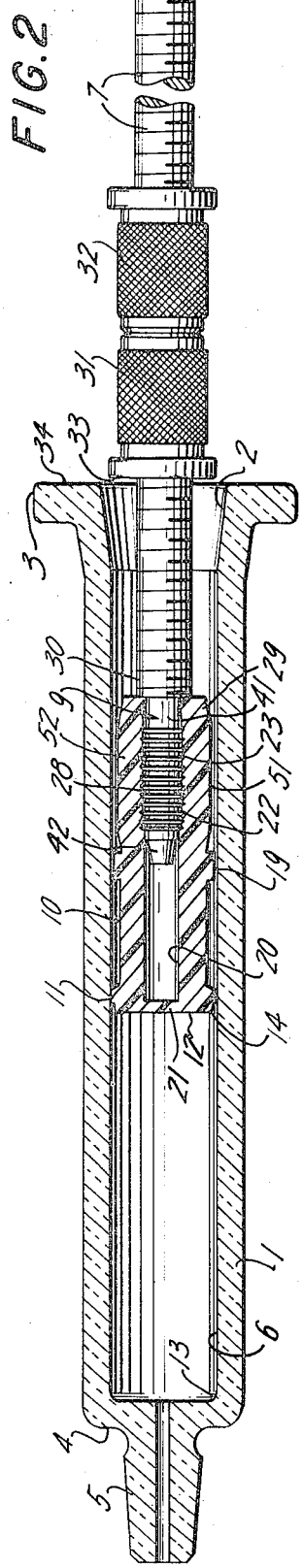
FIG. 2 is a sectional side view of an assembly wherein the plunger rod has been released by the user and the plunger rod has automatically returned to a centered position with respect to the syringe barrel.
Figure 5:
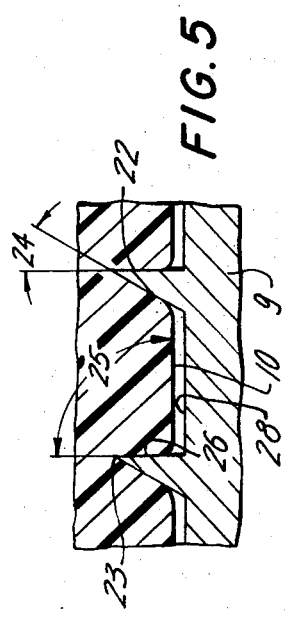
FIG. 5 is an enlarged sectional side view of a portion of the ridges on the plunger rod as it engages a portion of the plunger body.

Referring to FIGS. 1 - 5, the mounting portion 9 has external ridges 22 which preferably have sharp edges 23 with an angle 24 of approximately 30° to facilitate cutting of the plunger body material and plastic deformation of the plunger body material around the ridges as illustrated in FIG. 5, which is an enlarged view. The diameter of the hole 20 in the plunger body is smaller than the diameter of the sharp edges 23 of the ridges, and after the plunger body 10 is pressed over the mounting portion 9 as shown in FIGS. 1 - 4, stresses in the plunger body tend to return the hole 20 to its original diameter as shown in FIG. 5. The ridges may be immediately adjacent each other, or they may be separated, as illustrated in FIGS. 1, 2 and 5 to provide easier manufacture, providing that sufficient length of engagement is available.

With reference to FIGS. 1 - 4, the mounting portion of the plunger rod is preferably provided with undercut 41, which preferably is approximately the same diameter as the diameter at the base 28 of the ridges. This undercut 41 permits somewhat easier manufacture of the ridges and it permits the hole 20 to return to nearly its original diameter adjacent the shoulder 27 as shown in FIG. 4, and thereby providing greater engagement between shoulder 27 and the adjacent face of the plunger body. This greater engagement lessens the possibility that the rear portion 29 could be pushed up over the diameter 30 on the plunger rod in the event of high forces being exerted against the forward face 12 of the plunger body.

This plunger body mounting means provides a very secure mounting. During one test of a 1cc insulin syringe with 22 ridges, with one ridge every 0.011 inch, with 0.102 inch diameter at the sharp edge 23 of the ridges, with 0.093 inch diameter at the base 28 of the ridges, with 0.093 inch diameter of the undercut 41, and with 0.093 inch diameter of the hole 20, an axial force of 75 pounds was required to pull the plunger body 10 off the plunger rod five days after assembly. This provides a high factor of safety since the optimum forces required to longitudinally move the plunger rod and plunger body assembly are only about ½ pound. However, a large factor of safety is desirable since the syringes undergo repeated thermal cycling as a result of sterilization, they may be mistreated, and the plunger rods are repeatedly moved to the side as illustrated in FIGS. 1 and 4.

For a 1cc insulin syringe with 0.2530 inch bore 6, approximately three thirty-seconds inch is a preferred diameter for the hole 20, base 28 of the ridges, and undercut 41, and it is preferred that the diameter at the sharp edges 23 of the ridges be approximately 0.01 inch greater than the diameter of hole 20.

The forward end 42 of the plunger rod mounting portion is preferably angled to a reduced diameter as shown in FIGS. 1 – 4. This permits easier hand or mechanized assembly of the plunger body 10 over the mounting portion 9.

Mounted on the plunger rod 7 are one or more volume stops 31 which preferably have an internal thread to engage an external thread on the plunger rod. The volume stop 31 is set at the desired position along the length of the plunger rod 7 in order to obtain the desired volume. After the volume stop 31 is set at the desired position, lock ring 32, which may be identical to volume stop 31, is tightened against volume stop 31 to prevent movement of the volume stop.

As shown in FIG. 1, the plunger rod 7 is pushed toward the side wall of the barrel by the user during filling of the syringe so that the forward face 33 of the volume stop comes in contact with the face 34 of the barrel and the plunger rod 7 comes in contact with the barrel at location 35, thus providing an exact and easily repeatable positioning of the plunger rod 7 and plunger body 10 and thereby providing an exact volume measurement. When the user releases the plunger rod 7, the compressive stresses at 36 and the tensile stresses at 37 in the elastic plunger body material in combination with the interaction of sealing bearing 11, centering bearing 19, and bore 6 of the barrel forces the plunger rod 7 to a substantially centered position with respect to the barrel as shown in FIG. 2. This centering is therefore accomplished without the need for the user to touch any part of the syringe. When the plunger rod 7 is in the centered position as shown in FIG. 2, the user can then expel the contents of the syringe in a conventional manner.

Figure 3:
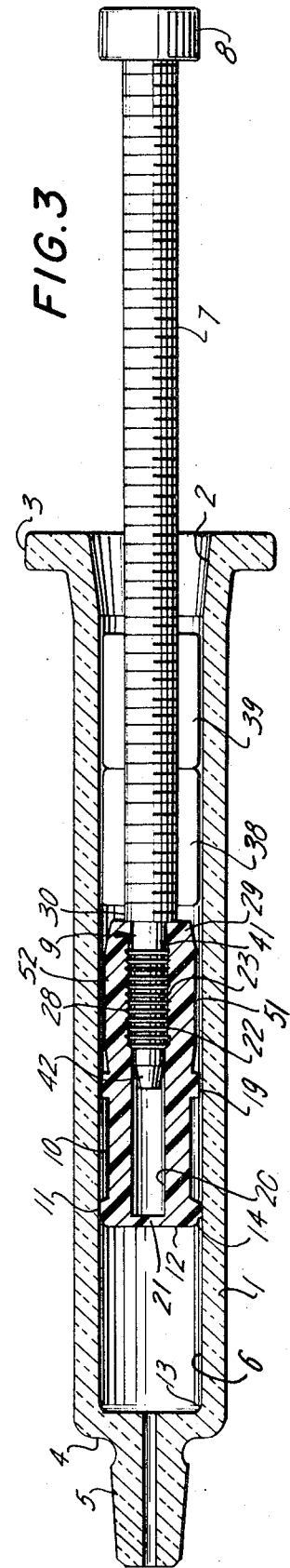
FIG. 3 is a sectional side view of an assembly wherein a volume stop and lock ring are positioned near the plunger body to provide additional centering of the plunger rod and thereby facilitate usage as a conventional syringe.

In some situations the users may wish to use the syringe with the volume stops to determine the required volume but then quickly change to conventional usage. As shown in FIG. 3, the volume stop 38 and lock ring 39, which may be identical parts, may be positioned near the plunger body 10 and thereby providing additional centering of the plunger rod in the barrel to facilitate conventional usage. The volume stop and lock ring may have an external shape to facilitate gripping, as shown in FIGS. 1 and 2, or they may have a simple cylindrical external shape to facilitate centering of the plunger rod in the barrel, as shown in FIG. 3.

Figure 6:
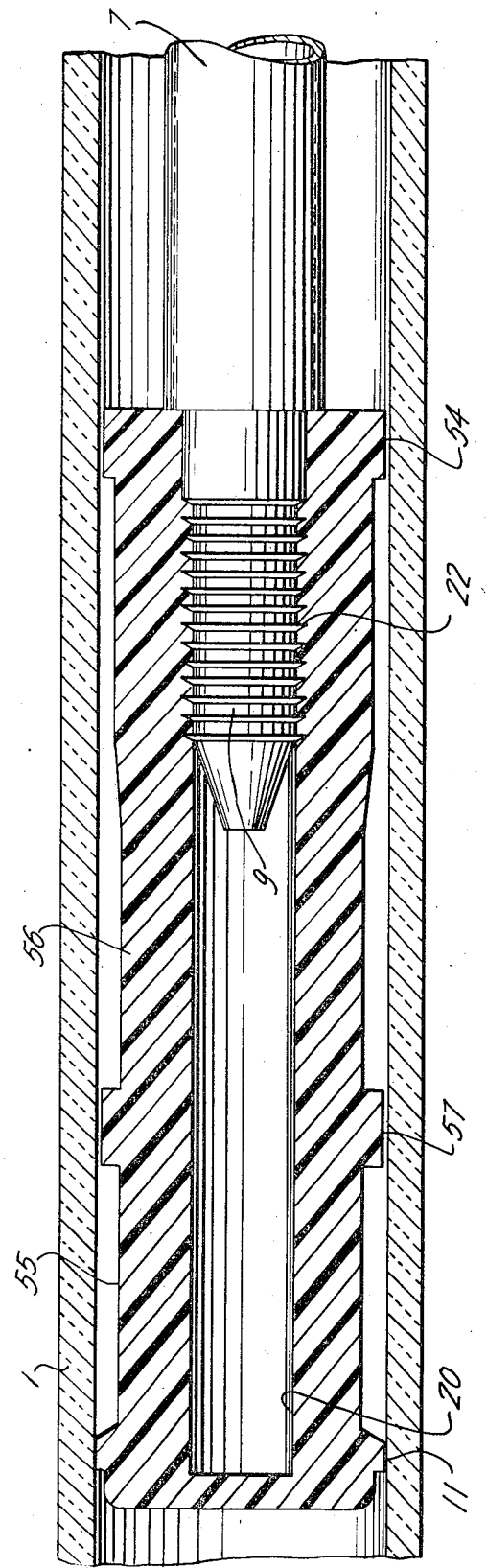
FIG. 6 is an enlarged sectional side view of portions of the plunger rod and barrel with two centering bearings.

FIG. 6 illustrates a plunger body 55 that is similar to the plunger body 10 in FIGS. 1 – 4 except that rear centering bearing 54 has been added and there is an increased distance between ridges 22 on the mounting portion 9 and the forward centering bearing 57. The FIG. 6 plunger body design is particularly advantageous for providing adequate centering of the plunger rod for long type syringes. The added centering bearing provides more accurate centering for the longer syringes. Flexing of the plunger rod to an angular position as illustrated in FIGS. 1 and 4 is permitted by the flexible wall 56 between ridges 22 and the forward centering bearing 57. After the plunger rod is pushed to the side and then released, it returns to the centered position as illustrated in FIG. 6.

What is claimed is:

1. A syringe comprising a barrel having a bore, a plunger body having a front sealing bearing, an intermediately located centering bearing of a diameter smaller than said front sealing bearing and a rear socket wall, said bearings being slidable in said bore;
    a plunger rod mounted in said rear socket wall for propelling said plunger body along in said bearings;
    a volume stop longitudinally movably mounted on said plunger rod; and
    means on said rod for locking said volume stop in selected volume determining positions;
    said rear socket wall being bendable and forming an elastic mounting for the forward portion of said rod to permit said rod to be inclined in said bore.

2. A syringe as claimed in claim 1, in which said plunger body is of dimensionally stable material with a low coefficient of friction, adequate sealing qualities and which is readily sterilizable.

3. A syringe as claimed in claim 2, in which said material is tetrafluoroethylene.

4. A syringe as claimed in claim 1, in which said front sealing bearing has a length of from 0.02 to 0.05 inch.

5. A syringe as claimed in claim 1, in which said front sealing bearing has a diameter larger than the syringe bore by from 0.0024 to 0.0035 inch.

6. A syringe as claimed in claim 1, in which said centering bearing has a diameter less than the syringe bore by 0.0005 to 0.004 inch.

7. A syringe as claimed in claim 1, in which said plunger has a central hole extending through said rear socket wall on inside said centering bearing and within said sealing bearing.

8. A syringe as claimed in claim 7, in which the barrel has a bore of about 0.2530 inch, said rear socket wall has a thickness of about one-sixteenth inch, and the center hole has a diameter of about three thirty-seconds inch.

9. A syringe as claimed in claim 7, in which said plunger rod has a mounting portion which enters said central hole, extends through said rear socket wall, and has means to prevent the inner end thereof from passing beyond said centering bearing.

10. A syringe as claimed in claim 9 in which said mounting portion has separate parallel external ridges with sharp edges to facilitate cutting of the plunger body material and plastic deformation thereof.

11. A syringe as claimed in claim 1, in which said plunger body is made from a centerless ground tetrafluoroethylene rod plus or minus 0.0005 inch tolerance on the diameter.

12. A syringe as claimed in claim 10, in which the centering bearing is positioned forward of the ridges in said mounting portion.

13. A syringe as claimed in claim 12, in which the sharp ridges have edges approximately 0.01 inch greater than the diameter of the central hole in the plunger.

14. A syringe as claimed in claim 13, in which the forward end of the plunger rod is angled to a reduced diameter.

15. A syringe as claimed in claim 1, in which said volume stop has a simple cylindrical external shape to facilitate centering of the plunger rod in the barrel.

16. A syringe as claimed in claim 1, in which said rear socket wall has a rear centering bearing of a diameter slightly less than that of the bore of said barrel.

* * * * *